L. GOLDMERSTEIN.
MASTER CONTROL AND LOCK FOR ELECTRIC CIRCUITS IN AUTOMOBILES.
APPLICATION FILED DEC. 4, 1915.
1,256,125.   Patented Feb. 12, 1918.
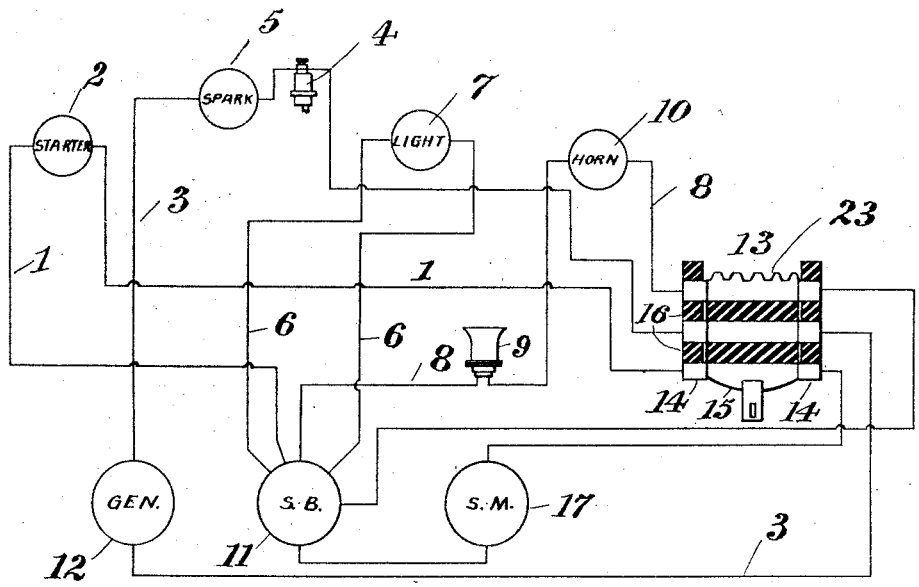
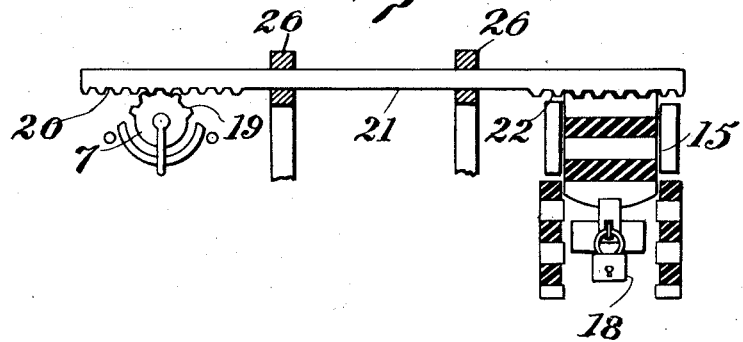

UNITED STATES PATENT OFFICE.

LEON GOLDMERSTEIN, OF NEW YORK, N. Y.

MASTER CONTROL AND LOCK FOR ELECTRIC CIRCUITS IN AUTOMOBILES.

1,256,125.        Specification of Letters Patent.      Patented Feb. 12, 1918.

Application filed December 4, 1915. Serial No. 64,981.

*To all whom it may concern:*

Be it known that I, LEON GOLDMERSTEIN, a subject of the Czar of Russia, and resident of the borough of Manhattan, in the city, county, and State of New York, have invented certain new and useful Improvements in Master Controls and Locks for Electric Circuits in Automobiles, of which the following is a specification.

This invention relates to locking means for the electrically operated parts and accessories of automobiles, such, for example, as the engine starter, the ignition switch, the electric light switch and the electrically operated horn; whereby said devices, when not in use, as when the car is standing, may be locked in inoperative condition; or in the instance of the electric lights, which may have a three way switch, representing respectively the positions of lights out, lights dim and lights full on; either one of those set positions may be included in the locking arrangement. Particularly, my invention is related to means including a master switch, whereby all of these parts or elements may be simultaneously locked through a single operation.

My improvement, therefore, is directed to the employment of a master switch, which is included in the engine starter circuit, the ignition circuit, the electric light circuit and the circuit which operates the electric horn. Said master switch may be of any suitable character; and, obviously, in a simple form comprises a stationary portion having conductive members in connection with the several local circuits, and a movable member adapted to alternately include said conductive members in the main electrical circuits and to insulate them therefrom. The said master switch is provided with suitable locking means, whereby in the insulated or open circuit positions which it can assume, it may there be locked to prevent the unwarranted use of any one or all of said parts.

The local circuit for the electric lights, which is usually provided with a three way switch, has in addition mechanical means whereby said switch will be locked through the master switch in any one of its desired three set positions, representing lights out, lights dim, or lights full on. Said device may comprise a sliding rack adapted to mesh with teeth upon the movable member of the master switch, when the latter has been moved to the open circuit position; said rack also meshing with gear teeth upon the electric light switch, and moved thereby in the adjustment of said electric light switch to its desired position before the operation of the master switch to its open circuit position.

It will, therefore, be observed that by the use of my said invention, a car driver is enabled, when leaving his car standing alone, to control all of the aforesaid automobile parts and accessories through the agency of a single switch, which he may then lock in a single operation, to prevent the unwarranted use of any one of those parts and accessories in his absence; thereby insuring the safety of the car against theft, by preventing the starting up of the engine, and avoiding the wastage of electrical current or tampering with the lights, and the annoyance of having the horn sounded by passers by.

Other features and advantages of my said invention will be hereinafter referred to.

In the drawing:

Figure 1 is a diagrammatic view illustrating my invention, and Fig. 2 is a detail of the mechanical connection between the electric light switch and the master switch.

In Fig. 1 will be seen a diagrammatic representation of various circuits, including different operative parts in the electrical lay out for an automobile, as, for example, a circuit 1 for the engine starter, in which is represented the starter switch 2; a circuit 3 for the spark plug 4, in which is represented a spark switch 5; a circuit 6 for the electric lights, in which is represented the switch 7, and a circuit 8 for the electric horn 9, in which is represented the switch 10.

It will be noted that the local circuits 1, 6 and 8 derive their energy from the storage battery 11, while the circuit 3 derives its energy from the generator 12, which may be a magneto. This arrangement is, of course, purely arbitrary, being indicated as a convenient method. The circuits 1, 3 and 6 all communicate with a master switch 13, said master switch being composed of stationary portions 14 and movable portion 15. In the instance indicated the stationary portions have electrically conducting parts with which the terminals of said circuits are connected, and also have insulating portions 16. The movable portion of the master switch is also provided with electrically conducting parts and insulating parts, and is adapted to be moved, as by a rack 24 and pinion 25, in a switching operation, to aline its conducting parts with the conducting parts of the stationary members, as shown in Fig. 1, thereby closing circuits respectively with the storage battery, through motor 17, and with the generator; and said switch portion 15 may be moved, as shown in Fig. 2, as by a sliding action, to electrically disconnect said switch portions and thus open the said circuits. In the latter, or other disconnected position, the switch portion 15 may be locked in any suitable manner. In the present example I have shown the movable portion 15 as having a hasp engaging with a fixed eye through which the bar of a padlock is passed.

The switching arrangement thus described renders inactive the starter, spark circuit and the horn. I have not included the electric light circuit in this arrangement, because it is desirable when leaving a car standing in the street at night, to have the lights burning, and the lights may be either dim or full on. Hence the electric light switch usually has three positions, viz: off, dim and full on. It is, therefore, necessary to have selective means for locking the switch which controls the electric light circuit, so that it may be secured in a desired set position through the same means which control the locking of the other electrically operated parts in the automobile. Therefore, (see Fig. 2) the electric light switch 7 is provided with teeth 19, meshing with a rack 20 on a slidable bar 21, said bar also having a rack 22 whose teeth are adapted to mesh with the corresponding teeth 23 on the movable switch member 15. When the switch 7 is moved to any one of its three stated positions it will, through the engagement of the teeth 23 upon the movable switch member with the teeth 22 on bar 21, thereby become locked against any deviation from that set position through the aforesaid locking engagement. It will, of course, be appreciated that the bar 21 will be so arranged and supported in the car, as by the guide 26, so as to be incapable of other than a sliding movement.

Variations may be resorted to within the spirit and scope of my said invention, and parts thereof may be used without others.

I claim:

1. The combination, with a distributing switch movable to different positions, of a master switch having a reciprocating member, and non-electrical means to mechanically engage said distributing switch in any one of its positions with the reciprocating member of said master switch, when said switch is in the open circuit position.

2. The combination, with a distributing switch movable to different positions, of a master switch having a reciprocating member, non-electrical means to mechanically engage said distributing switch in any one of its positions with the reciprocating member of said master switch, when said switch is in the open circuit position, and means for locking said reciprocating member.

3. The combination, with a distributing switch movable to different positions, of a master switch having a reciprocating member, a slidable member between said switches, means for communicating movement from said distributing switch to said slidable member, and means whereby said slidable member may engage with the reciprocating member of said master switch.

4. The combination, with a distributing switch movable to different positions, of a master switch having a reciprocating member, a slidable member between said switches, means for communicating movement from said distributing switch to said slidable member, means whereby said slidable member may engage with the reciprocating member of said master switch, and means for locking said reciprocating member.

Signed at the borough of Manhattan in the city, county and State of New York this 3rd day of December A. D. 1915.

LEON GOLDMERSTEIN.

Witnesses:
W. E. FEE,
F. W. BARKER.